H. M. HOWELL.
DEMOUNTABLE RIM.
APPLICATION FILED JULY 11, 1921.

1,433,279.

Patented Oct. 24, 1922.
2 SHEETS—SHEET 1.

WITNESSES

INVENTOR
Henry M. Howell.
BY
ATTORNEYS

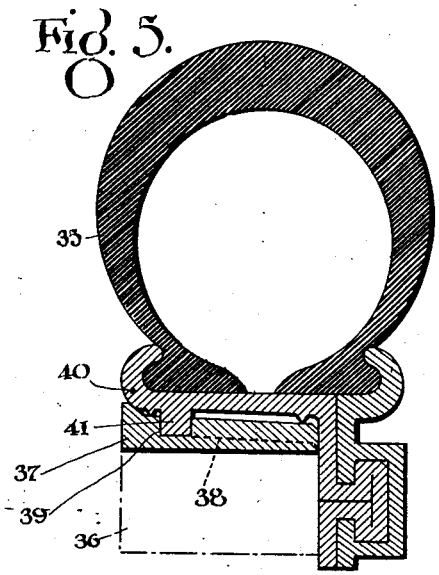
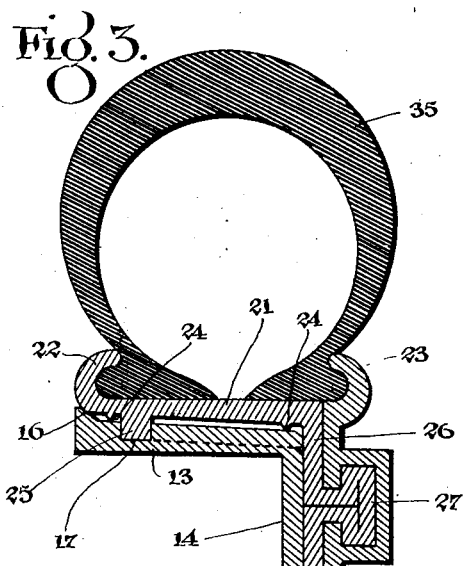
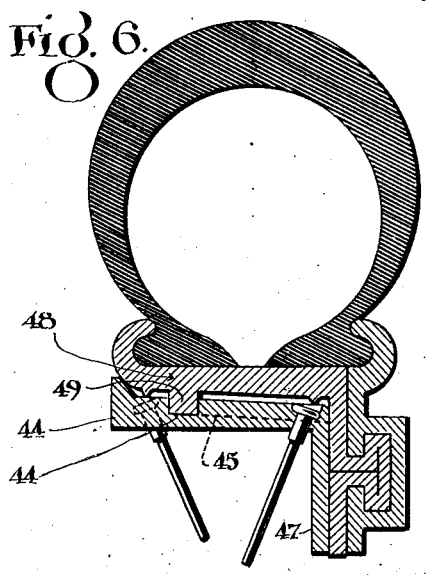
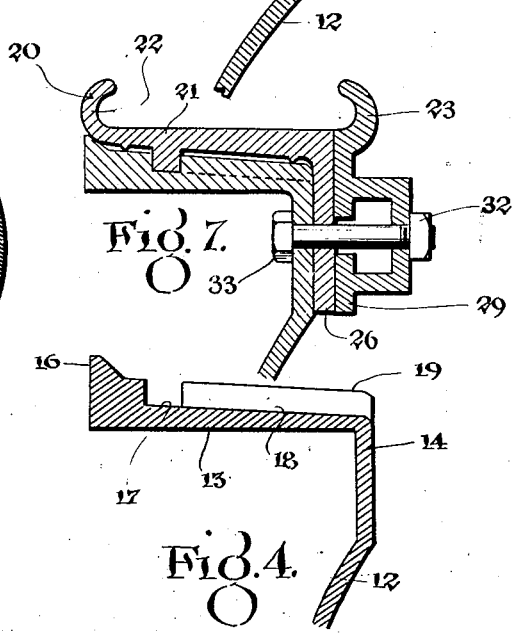

Patented Oct. 24, 1922.

1,433,279

UNITED STATES PATENT OFFICE.

HENRY M. HOWELL, OF MONROE, LOUISIANA, ASSIGNOR, BY DIRECT AND MESNE ASSIGNMENTS, TO INSTANT CHANGEABLE TIRE RIM COMPANY, INC., OF MONROE, LOUISIANA, A CORPORATION.

DEMOUNTABLE RIM.

Application filed July 11, 1921. Serial No. 483,923.

*To all whom it may concern:*

Be it known that I, HENRY M. HOWELL, a citizen of the United States, and a resident of Monroe, in the parish of Ouachita and State of Louisiana, have invented certain new and useful Improvements in Demountable Rims, of which the following is a specification.

The present invention relates to an improvement in demountable rims of the type forming the subject-matter of my prior Patent No. 1,383,810, dated July 5, 1921.

The object of the invention is to provide a rim of this character adapted to be utilized in conjunction with a spare tire pumped up and ready for service, which may be readily and easily mounted on or demounted from any type of wheel, which permits of the removal and replacement of a tire on the demountable rim without the necessity of pinching the tire over the tire retaining flange, and which is in general of simple and durable construction, ready, convenient and reliable in operation and easy and comparatively inexpensive to manufacture.

Other objects and advantages of the invention reside in certain novel features of the construction, combination and arrangement of parts which will be hereinafter more fully described and particularly pointed out in the appended claims, reference being had to the accompanying drawings forming part of this specification, and in which:—

Figure 3 is a view in transverse section of the embodiment of the invention shown in Figure 1.

Figure 4 is a detailed view in transverse section of the fixed rim on the wheel, the section being taken through one of the transverse slots.

Figure 5 is a view in transverse section illustrating the invention embodied in a wooden wheel.

Figure 6 is a view in transverse section illustrating the invention embodied in conjunction with wire wheels.

Figure 7 is a view in transverse section illustrating the invention embodied in conjunction with disk wheels.

Figure 1:
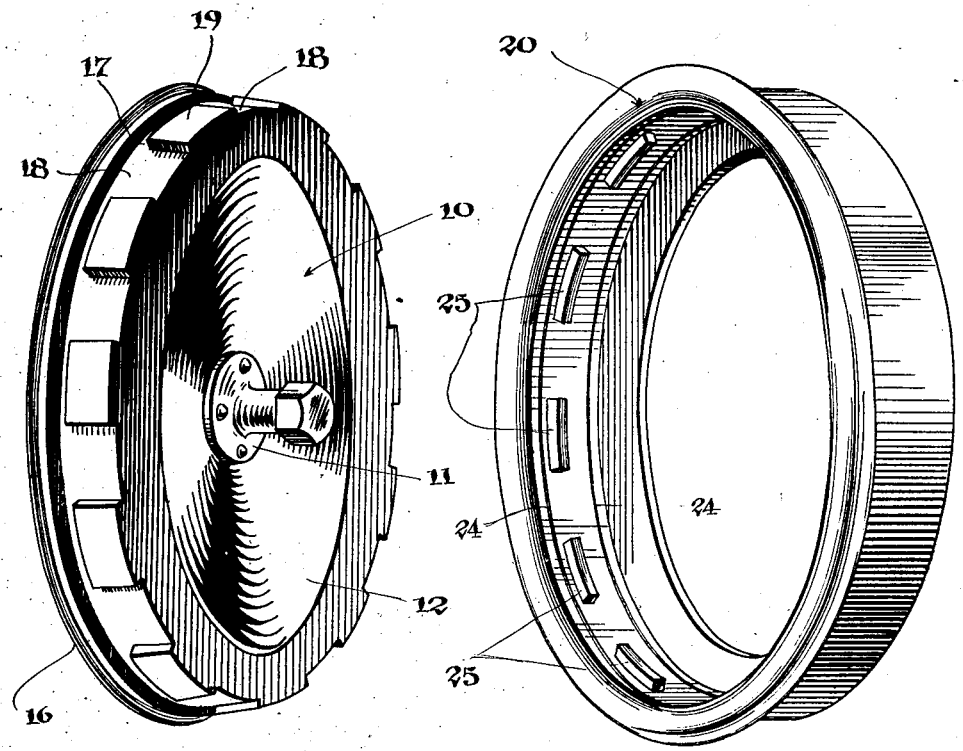
Figure 1 is a group view in perspective illustrating the invention embodied in a disk wheel with the demountable rim removed and the outer tire retaining flange removed from the demountable rim.

Referring to the drawings, wherein for the sake of illustration is shown the preferred embodiments of the invention, and more particularly to Figs 1 to 4 inclusive, the numeral 10 designates generally a disk wheel which may be of any standard or desired construction, and which preferably includes a hub 11, a body portion or webbing 12 concaved or arched, and a fixed rim 13, which is connected with the body portion or webbing 12 by an annular flange 14 preferably integral with the fixed rim and the body portion, and disposed at right angles to the axis of the wheel.

The fixed rim 13 is provided with a circumferential shoulder 16, which extends around its inner marginal edge and which is beveled to constitute a seat or abutment for the demountable rim. The fixed rim is also provided with an annular channel 17 extending circumferentially thereof and disposed in parallel relation to and slightly spaced from the annular shoulder 16 thus leaving the periphery of the fixed rim adjacent the shoulder 16 a flat inclined surface, designated at 16$^a$ and adapted to assist in the support of the demountable rim as will be understood. A plurality of transverse slots 18 lead from the channel 17 across the fixed rim to the outer side thereof. The bottom walls of these slots are inclined as clearly shown in Fig. 3, and the circumferential faces 19$^a$ of the segments 19 defined by the slots are also inclined so as to be parallel with the bottom walls of the slots and coplanar with the surface 17$^a$. These segments 19 thus formed coact with the channel 17 and constitute locking blocks and with the surface 17$^a$ take largely the weight of the demountable rim and tire and bear and absorb the stresses incident to its use as will hereinafter more fully appear.

A demountable rim designated generally at 20 is provided and includes a base section 21, an inner fixed tire retaining flange 22, and an outer removable tire retaining flange 23. On the underside of the base section 21 V-shaped ridges 24 are provided and engage the beveled or inclined faces of the segments 19 in the assembly.

A circumferential series of locking ribs 25 are carried on the underside of the base section and are adapted to pass through the slots 18 into the locking channel 17 and to be rotated in the channel until they come behind and engage the locking blocks 19, the locking ribs serving when in this position to releasably maintain the demountable rim on the fixed rim of the wheel.

Figure 2:
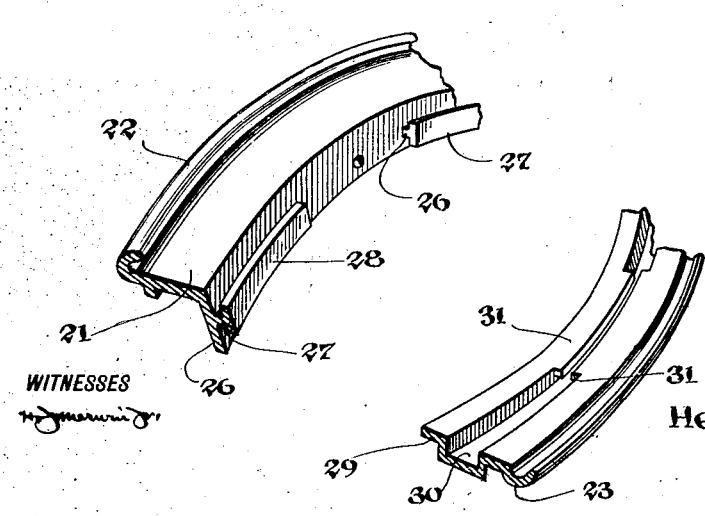
Figure 2 is a fragmentary perspective view illustrating the demountable rim employed in conjunction with all forms of the invention.

The demountable rim is identical in all embodiments of the invention and includes the locking plate 26 integral with the base section 21 of the rim and having a plurality of arcuate locking flanges 27 provided with enlarged heads 28. The arcuate locking flanges 26 are spaced from each other as shown in Fig. 2.

The outer removable tire retaining flange 23 includes the locking plate 29 cooperable with the locking plate 26 of the base section and having a channel 30, the outer sides of the upper and lower walls of the channel having arcuate shoulders 31 spaced circumferentially to provide for the entrance of the enlarged heads 27 of the locking flanges 26 into the channel 30 and spaced radially to accommodate the locking flanges 27 when the outer plate 29 has been moved circumferentially with respect to the inner plate 26 so as to confine the enlarged heads 28 behind the locking shoulders 31.

Common means is provided for preventing circumferential movement of the demountable rim on the fixed rim and for preventing circumferential movement of the locking plate 29 with respect to the locking plate 26 when the locking plates are assembled. This means includes a bolt 32 extending through alined openings in the locking plate and in the wheel and adjustably held in position by a nut 33.

A tire designated at 35 is arranged on the demountable rim. The tire may be mounted on the rim and demounted therefrom by simply removing the outer tire retaining flange and this obviates the necessity of pinching the beads of the tire over the flanges. Preferably a spare rim and tire are carried on the vehicle with the tire pumped up and ready for service so that when any one of the tires is incapacitated it may be readily removed by detaching the nut 33 and removing the bolt 32, and then grasping the tire so as to rotate the demountable rim on the fixed rim until the locking ribs 25 are alined with the transverse slots 18. When the locking ribs are so alined with the slots, the rim may be pulled laterally from the wheel. The spare rim with the tire pumped up and ready for service may then be readily placed on the rim by simply alining its locking ribs with the transverse slots, pushing the rim through the slots until the ribs are received in the locking channel, then rotating the demountable rim until the locking ribs are positioned behind the locking blocks 19 and replacing the locking bolt and its nut.

In Figure 5 the invention is shown embodied in a wooden wheel, the felly of which is designated at 36. A fixed rim indicated at 37 is mounted on the felly and is constructed in all respects like the fixed rim 13, being provided with transverse slots 38 and a locking channel 39. The demountable rim here designated at 40 is identical with the demountable rim above described, and includes a series of locking ribs 41 which cooperate with the transverse slots 38 and the locking channel 39 precisely in the same manner that the locking ribs 25 cooperate with the locking channel 17 in the embodiment of the invention above described.

In Figure 6 the invention is shown embodied in a wire wheel construction which includes spokes 43, a fixed rim 44 identical in all respects with the fixed rim shown in Figs. 1 and 3, and having transverse slots 45 and a locking channel 46. The fixed rim has integral therewith an annular flange 47 which corresponds with the annular flange 14 in the embodiment shown in Figure 3. The demountable rim which is designated at 48 is identical in construction with the demountable rims shown in Figs. 1 and 3, and includes a series of locking ribs 49 which cooperate with the slots 45 and the channel 46.

The operation of the embodiments shown in Figs. 5 and 6 is identical in all respects with the operation of the embodiment shown in Figs. 1 to 3, the embodiments shown in Figs. 5 and 6 serving merely to illustrate how the invention is adapted for use with wooden or wire wheels.

I claim:

1. In combination with a wheel including a fixed rim having an annular abutment shoulder around one marginal edge and provided with a locking channel slightly spaced from and parallel to the abutment shoulder, the periphery of the fixed rim between the shoulder and the channel comprising a bearing surface, said fixed rim having transverse grooves leading from said channel, the grooves defining segments constituting locking blocks, the peripheral faces of which presenting bearing surfaces, a demountable rim cooperating with the fixed rim and having ridges thereon engagable with the bearing surfaces of the fixed rim for supporting the demountable rim on the fixed rim, and locking ribs carried by the demountable rim and adapted to be passed through the transverse slots into the locking channel and to be rotated to locking position behind the locking block, and means for preventing circumferential movement of the demountable rim with respect to the fixed rim.

2. In a device of the character described, a fixed rim having a locking channel slightly spaced from and parallel to one marginal edge, the periphery of the fixed rim between the adjacent marginal edge and the locking channel constituting a bearing surface, said fixed rim having transverse grooves leading from the channel to the remote marginal edge and defining segments constituting locking blocks, the peripheral faces of the segments presenting bearing surfaces, and a demountable rim supported upon the bearing surfaces of the fixed rim and having locking ribs adapted to pass through the transverse slots into the locking channel and to be rotated to locking position behind the locking blocks.

3. In a device of the character described, a fixed rim, a demountable rim, cooperating means between the demountable rim and the fixed rim for locking the demountable rim on the fixed rim when the demountable rim is moved transversely onto the fixed rim and then rotated circumferentially with respect thereto, releasable means for holding the demountable rim against circumferential movement with respect to the fixed rim, and independent means for supporting the demountable rim on the fixed rim including ridges carried by the demountable rim, said fixed rim having bearing surfaces extending over a substantial portion of its circumferential extent and upon which the ridges are engaged and directly supported whereby the demountable rim is supported on the fixed rim independently of said cooperating means.

HENRY M. HOWELL.